Feb. 13, 1945. G. L. WILLIAMS 2,369,422
PROPELLER SUPPORTING AND DRIVING MECHANISM
Filed July 1, 1943 2 Sheets-Sheet 1

INVENTOR
George L. Williams
BY
Charles L. Shelton
ATTORNEY.

Feb. 13, 1945.  G. L. WILLIAMS  2,369,422
PROPELLER SUPPORTING AND DRIVING MECHANISM
Filed July 1, 1943  2 Sheets-Sheet 2

INVENTOR
George L. Williams
BY
Charles L. Shelton
ATTORNEY.

Patented Feb. 13, 1945

2,369,422

UNITED STATES PATENT OFFICE 2,369,422

PROPELLER SUPPORTING AND DRIVING MECHANISM

George L. Williams, Manchester, Conn., assignor to United Aircraft Corporation, East Hartford, Conn., a corporation of Delaware Application July 1, 1943, Serial No. 493,062

6 Claims. (Cl. 74—305)

This invention relates to improved propeller supporting and driving mechanism and has particular reference to an improved mechanism forming the driving connection between an engine crankshaft and a propeller shaft driven thereby.

One object of the present invention is the provision of such an improved driving mechanism in which the propeller shaft is supported independently of the engine crankshaft and has only a torsional connection therewith.

A further object is the provision of an improved propeller shaft driving mechanism including reduction gearing associated with the propeller shaft and a loose splined coupling between an element of said reduction gearing on said propeller shaft and the engine crankshaft in which the propeller shaft and gearing are completely isolated from all eccentric movements of the crankshaft relative to its support.

A still further object of the invention is the provision of an improved and simplified propeller shaft supporting and driving mechanism including reduction gearing of the planetary type.

Other objects and advantages will be more particularly pointed out hereinafter or will become apparent as the description proceeds.

Figure 1:
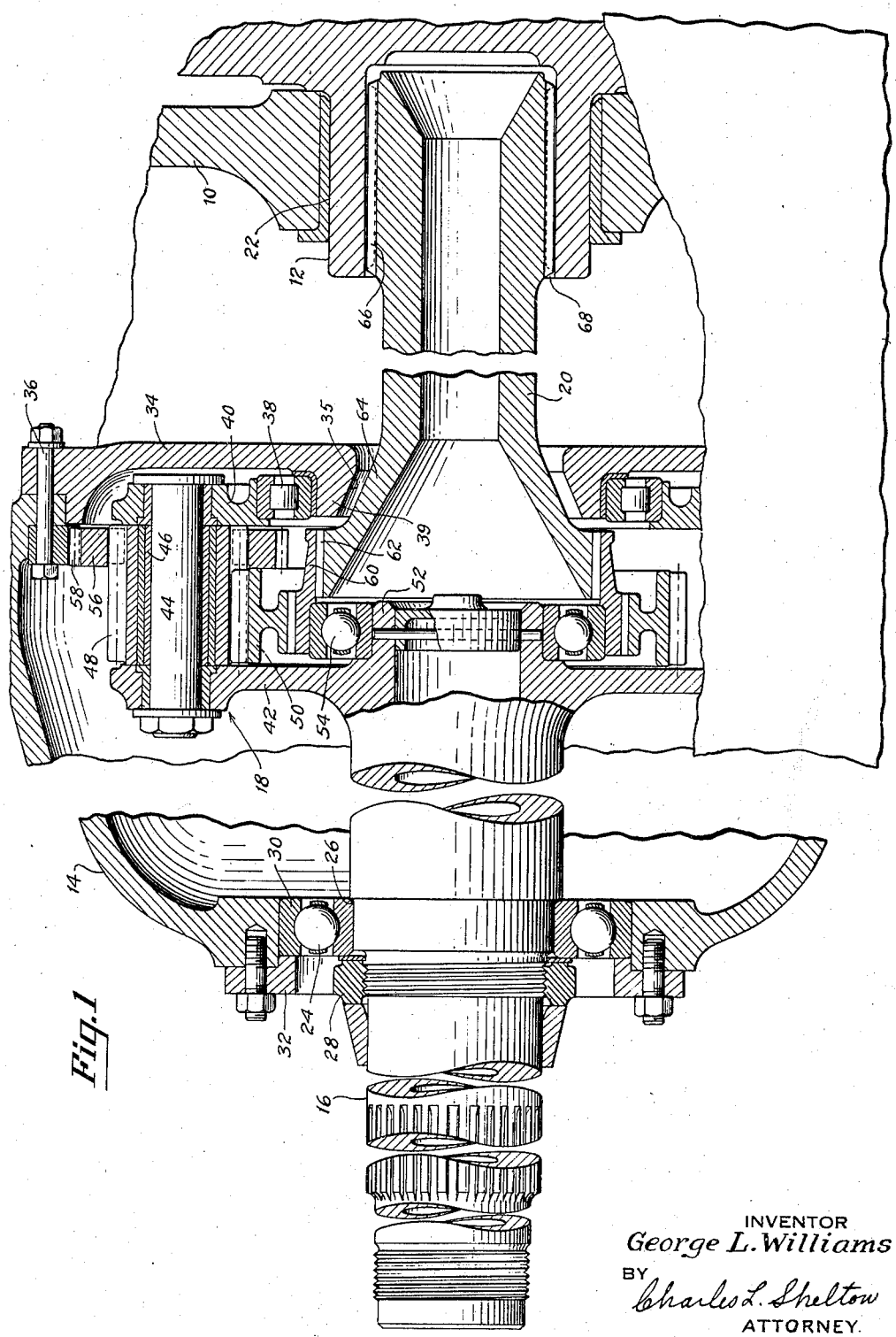

In the accompanying drawings, in which like reference characters are used to designate similar parts, Fig. 1 is a longitudinal sectional view through the nose or front section of an aircraft engine showing fragmentary portions of the engine crankshaft and the propeller shaft with one form of improved driving connection therebetween.

Figure 2:
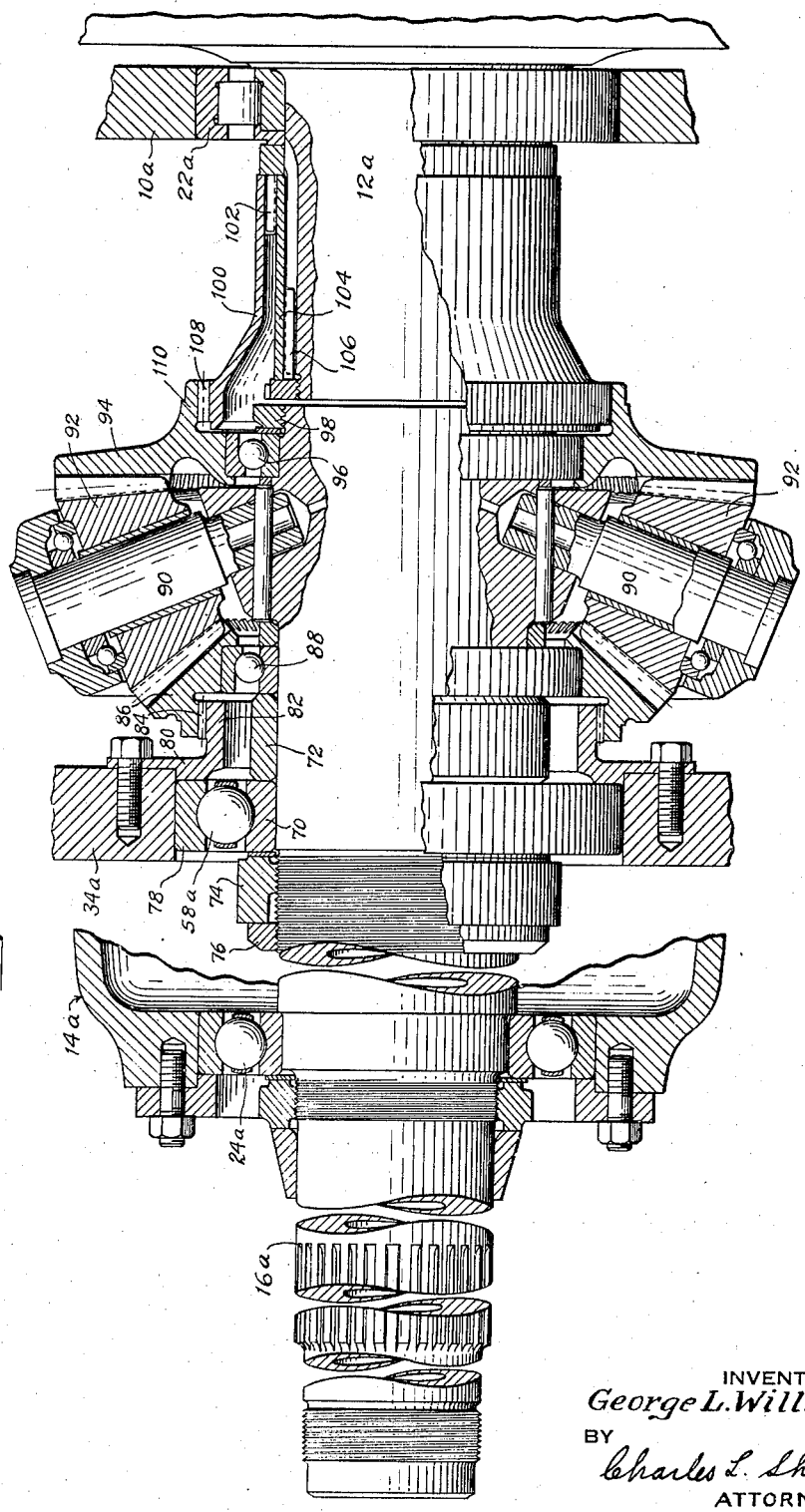

Fig. 2 is a similar view of a modified form of driving connection.

In the construction shown in Fig. 1, the numeral 10 indicates the front portion of an engine crankcase forming a support for an engine crankshaft 12. A gear housing 14 comprising an extension of the crankcase provides an enclosure for the propeller shaft 16 and the reduction gearing associated therewith generally indicated at 18. A loose coupling member 20 hereinafter more fully described cooperates with gearing 18 to form a torsional driving connection between shafts 12 and 16.

The crankshaft 12 has a front bearing 22 in the crankcase 10. It has been found that when the engine becomes heated in normal running the portion of the crankcase 10 which supports the bearing 22 expands more than the bearing, permitting some radial movement of the bearing in its support which, together with the clearance initially present between the shaft and the bearing, results in wobbling vibration of the crankshaft. It has been common practice, particularly in radial engines, to support the propeller shaft and crankshaft one within the other at or near this front crankshaft bearing 22. The radial motion of the crankshaft within the clearances due to gas forces acting on the crankpins through the pistons and rods is transmitted directly to the propeller shaft, resulting in vibration of the propeller blades and the engine. This vibration often has been found to be very severe and even dangerous. It is among the objects of this invention to provide a construction for preventing the transmission of this wobbling vibration of the crankshaft to the propeller shaft and to the reduction gearing associated therewith.

To this end the propeller shaft and the reduction gearing are supported in the housing 14 wholly independently of the engine crankshaft. The forward journal for the propeller shaft comprises an anti-friction bearing 24 in the nose of housing 14, the inner race of this bearing being secured on the shaft between a shoulder 26 and a clamping ring 28 threaded on the shaft while the outer race 30 is positioned in the front end of the housing 14 by a ring 32 bolted to the forward end of the housing 14. The propeller shaft is supported at its rear end on an inwardly directed web or partition 34 extending inwardly from the housing 14 and having a bolted connection 36 to the housing. The web 34 has an annular passage 35 of substantial dimensions in axial alignment with the shafts 12 and 16 and carries an anti-friction bearing 38 supported on a forwardly directed flange 39 surrounding the passage. The bearing 38 supports the outer gear cage ring 40 which is connected rigidly to an annular flange 42 formed integral with the propeller shaft by a series of peripherially spaced studs 44 provided with sleeves 46 suitably spacing ring 40 from the flange 42. This connection may be supplemented by other means such as lugs formed integrally with either member 40 or 42 and spaced to project between the planet gears and to make contact between members 40 and 42 with a through bolt to insure rigidity. Each stud 44 carries an elongated planetary pinion 48 and these pinions mesh at their forward ends with a rotatable sun gear 50 journaled on a reduced end portion 52 of the propeller shaft by an anti-friction bearing 54. Each pinion 48 has a portion of increased diameter at its rear end, herein a separate ring 56 having external teeth which mesh with corresponding internal teeth of a ring gear 58 of the planetary gearing secured to the housing 14 by the bolted connection 36.

The rotatable sun gear 50 has an annular rearwardly extended hub or sleeve 60 provided with internal splines 62 which cooperate with similar external splines formed on the periphery of the flange 64 of the coupling 20 which projects through the passage 36 into the sleeve 60. At its rear end the coupling 20 is provided with external splines 66 which cooperate with similar internal splines formed in the annular side wall of a recess 68 in the forward end of the crankshaft.

The splines at the opposite ends of the coupling member 20 have intentionally a free fit with the corresponding splines on the crankshaft 12 and the rotatable sun gear 50 so that the coupling 20 has a small degree of freedom of angular movement and provides, in effect, a universal joint interposed between the crankshaft and the planetary gearing within the limits of the radial movement of the crankshaft due to the wobble vibration.

As a result of this construction a simplified support is provided for the propeller shaft and its associated reduction gearing, it being noted in this connection that the propeller shaft and gearing require only three major bearings. Further by means of the overhanging bearing support for the cage of the reduction gearing an exceedingly compact and simple structure results. It will also be apparent that as a result of having the adjacent ends of the crankshaft and propeller shaft spaced apart and connected only by the free splined coupling above described, the transmission of wobble or eccentric vibrations of the crank shaft to the propeller shaft and its associated reduction gearing is entirely eliminated with a resultant decrease in vibration as well as a decrease in wear on the gearing.

In the modification shown in Fig. 2 a generally similar construction is provided utilizing bevel planetary pinions in place of the spur gear pinions of the Fig. 1 construction. In this figure the crank shaft 12a is supported in the forward portion 10a of the crankcase by an anti-friction bearing 22a and the propeller shaft 16a is journaled to the front of the housing 14a in an anti-friction bearnig 24a. The rear journal for the propeller shaft comprises an anti-friction bearing 58a carried by an inwardly directed web 34a carried by housing 14a. The inner race 70 of bearing 58a is positioned on shaft 16a between a rear annular collar 72 carried by the shaft and a forward clamping ring 74 threaded to the shaft and secured by a locking ring 76. The outer race 78 of bearing 58a is positioned by an annular plate 80 which is bolted to the rear face of web 34a and has an annular flange 82 concentric with the propeller shaft and provided with external teeth 84 adapted to engage the corresponding internal teeth on the hub of a stationary bevel gear 86 which is supported on the rotatable shaft 16a by an anti-friction bearing 88. A plurality of forwardly directed planetary pinion carrying studs 90 carried by propeller shaft 16a support the beveled planetary pinions 92 in position to cooperate with the fixed bevel gear 86 and also to cooperate with the teeth of a rotatable bevel gear 94 which is journaled on a reduced rear end portion of the propeller shaft by anti-friction bearing 96. The bearing 96 is held axially in place on the shaft by means of a ring 98 threaded to the end of the shaft in a usual manner.

A free spline coupling 100 is provided for connecting the crankshaft 12a with the rotatable gear 94, this coupling being provided at its rear end with internal splines 102 which engage with corresponding external splines on a sleeve 104 secured to the crankshaft 12a by a key 106. At its forward end the coupling 100 is provided with external splines 108 which cooperate with corresponding internally formed splines on a rearwardly extending flange 110 formed integral with the bevel gear 94.

As in the previous construction shown in Fig. 1 the splines 102 and 108 on the coupling 100 have a sufficiently free fit with the cooperating splines on the crankshaft and the gear 94 to permit a limited amount of angular movement of the coupling relative to the axis of the crankshaft and propeller shaft sufficient to absorb any wobble vibrations of the crankshaft and its bearing 22a in the crankcase 10a.

Thus it will be evident that in both of the embodiments shown there is provided a driving connection between the engine crankshaft and the engine supported propeller shaft which is capable of transmitting only torsional forces transmitted in either direction between the two shafts and more particularly a connection which isolates the propeller shaft from all movement of the crank shaft other than pure rotational movement.

While I have illustrated in the accompanying drawings two embodiments of the invention it will be understood that numerous changes may be made in the details of the construction without departing from the scope of the invention, as defined by the following claims.

What I claim as new and desire to secure by Letters Patent is:

1. In combination, an engine crankcase, a crankshaft rotatably supported in said crankcase, a housing including an extension of said crankcase, a propeller shaft rotatably supported in said housing independently of and in substantially axial alilgnment with said crankshaft, and torsional driving connections between said shafts including planetary gearing having a rotatable gear journalled on said propeller shaft, a gear restrained from rotation by said housing and planetary pinions carried by said propeller shaft and cooperating with said gears and a torque coupling member free from lateral support other than loosely splined connections at its opposite ends to said crankshaft and said rotatable gear respectively.

2. In combination, an engine crankcase, a crankshaft rotatably supported in said crankcase, a housing including an extension of said crankcase, a propeller shaft rotatably supported in said housing, said propeller shaft being axially spaced from and in substantially axial alignment with said crankshaft, a web extending inwardly from said housing, said propeller shaft having two journals, one in said web toward the rear end of said propeller shaft, and another forward thereof in said housing, and torsional driving connections between said shafts including planetary gearing having a gear rotatable on said propeller shaft and a coupling mechanically independent of both said journals having free spline connections at its opposite ends to said crank shaft and to said rotatable gear respectively, said connections providing freedom of radial motion of the crankshaft without transmission of said radial motion to the propeller shaft within the limits of normal bearing clearances.